(12) United States Patent
Lee (10) Patent No.: US 11,695,135 B2
(45) Date of Patent: Jul. 4, 2023

(54) WATER DISCHARGE OPTIMIZATION FOR FUEL CELL VEHICLES

(71) Applicants: Hyundai Motor Company, Seoul (KR); Kia Motors Corporation, Seoul (KR)

(72) Inventor: Kevin Lee, Los Angeles, CA (US)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 213 days.

(21) Appl. No.: 17/201,840

(22) Filed: Mar. 15, 2021

(65) Prior Publication Data

US 2022/0293976 A1 Sep. 15, 2022

(51) Int. Cl.
*H01M 8/04119* (2016.01)
*H01M 8/0432* (2016.01)
(Continued)

(52) U.S. Cl.
CPC ..... *H01M 8/04179* (2013.01); *H01M 8/0432* (2013.01); *H01M 8/04231* (2013.01);
(Continued)

(58) Field of Classification Search
CPC ......... H01M 8/04179; H01M 8/04231; H01M 8/0432; H01M 8/04514; H01M 8/04522; H01M 8/04291; H01M 8/04156; H01M 8/04303; H01M 8/04776; H01M 8/0491; H01M 8/04992; H01M 8/04164; H01M 8/04171; H01M 8/04328; H01M 8/04335; H01M 8/04343; H01M 8/0435; H01M 8/04358; H01M 8/04365; H01M 8/04373; H01M 8/04492; H01M 8/04529; H01M 8/04843; H01M 8/0485; B60L 15/20; B60L 58/30; B60L 2240/12; B60L 2240/662

See application file for complete search history.

(56) References Cited

U.S. PATENT DOCUMENTS 7,108,091 B2 9/2006 Guidry et al.
7,815,250 B2 10/2010 Oshio et al.
(Continued)

FOREIGN PATENT DOCUMENTS

JP 4931709 B2 5/2012
KR 101124990 B1 3/2012

*Primary Examiner* — Matthew W Van Oudenaren
(74) *Attorney, Agent, or Firm* — Fox Rothschild LLP (57) ABSTRACT

Methods and systems are described for optimizing water discharge in fuel cell vehicles. The system includes a fuel cell stack, a blower for purging water from the fuel cell stack and a controller. The controller detects that an ambient temperature satisfies a threshold temperature. The controller determines the fuel cell vehicle is approaching a stopping location. The controller calculates a water discharge time prediction necessary to purge excess water from the fuel cell stack while the fuel cell vehicle is operating in response to detecting that the ambient temperature satisfies the threshold temperature and the fuel cell vehicle is approaching the stopping location. The water discharge time prediction is calculated based on the blower operating while the fuel cell stack is in at least one of an idle state and a stopped state as the fuel cell vehicle approaches the stopping location.

20 Claims, 7 Drawing Sheets

(51) Int. Cl.
*H01M 8/04492* (2016.01)
*H01M 8/04223* (2016.01)
*B60L 58/30* (2019.01)
*H01M 8/04291* (2016.01)
*B60L 15/20* (2006.01)
*H01M 8/04303* (2016.01)

(52) U.S. Cl.
CPC ... *H01M 8/04514* (2013.01); *H01M 8/04522* (2013.01); *B60L 15/20* (2013.01); *B60L 58/30* (2019.02); *B60L 2240/12* (2013.01); *B60L 2240/662* (2013.01); *H01M 8/04291* (2013.01); *H01M 8/04303* (2016.02); *H01M 2250/20* (2013.01)

(56) References Cited

U.S. PATENT DOCUMENTS

| | | | |
|---|---|---|---|
| 8,497,045 B2 | 7/2013 | Ko et al. | |
| 2015/0099200 A1* | 4/2015 | Staley | B60L 1/02 429/413 |

* cited by examiner

FIG. 1

| CSD Lvl | Amb T. |
|---|---|
| Lv3 | -30°C |
| Lv2 | -20°C |
| Lv1 | 10°C |

FIG. 2

| Coulomb | Lv1 | Lv2 | Lv3 |
|---|---|---|---|
| 4000 | 0s | 10s | 14s |
| 8000 | 0s | 15s | 20s |
| 15000 | 0s | 18s | 23s |
| 25000 | 0s | 21s | 26s |
| >50000 | 0s | 21s | 26s |

FIG. 3

| VehSpd | Lv2 | Lv3 |
|---|---|---|
| 20 kph | 25,000 Rpm | 28,000 Rpm |
| 40 kph | 30,000 Rpm | 40,000 Rpm |
| 60 kph | 40,000 Rpm | 50,000 Rpm |
| 80 kph | 50,000 Rpm | 75,000 Rpm |
| 100 kph | 75,000 Rpm | 75,000 Rpm |

FIG. 4

| Min. Air Blower Rpm | Effective % Factor respect to 75,000 Rpm |
|---|---|
| 25,000 | 0.30 |
| 30,000 | 0.40 |
| 40,000 | 0.65 |
| 50,000 | 0.70 |
| 75,000 | 1.00 |

WATER DISCHARGE OPTIMIZATION FOR FUEL CELL VEHICLES

TECHNICAL FIELD

The present disclosure relates generally to water discharge optimization, and more particularly, to water discharge optimization for fuel cell vehicles.

BACKGROUND

Fuel cell vehicles generate significant amounts of water. Excess water may be contained in the fuel cell stack when a fuel cell vehicle shuts down. Cold temperatures may require the excess water to be discharged from the vehicle to prevent the fuel cell stack and fuel cell system from freezing. Some fuel cell vehicles conduct a cold shut down to purge excess water from the fuel cell stack when the vehicle shuts down. In cold environments, the discharged water may freeze and create ice where the fuel cell vehicle is parked.

During a cold shut down, an air blower may operate at maximum speed to discharge the water from the fuel cell stack. However, the air blower may be loud and generates noise, potentially alarming operators and bystanders. Additionally, ice created by the discharged water creates safety concerns for operators and bystanders. Currently, vehicle operators are required to engage a water discharge button to discharge excess water prior to arriving at their destination.

SUMMARY

The present disclosure provides methods, systems, articles of manufacture, including computer program products, for optimizing water discharge in fuel cell vehicles.

In one aspect, there is provided a system including a fuel cell stack, a blower for purging water from the fuel cell stack, and a controller. The controller detects that an ambient temperature satisfies a threshold temperature. The controller determines the fuel cell vehicle is approaching a stopping location. The controller calculates a water discharge time prediction necessary to purge excess water from the fuel cell stack while the fuel cell vehicle is operating in response to detecting that the ambient temperature satisfies the threshold temperature and the fuel cell vehicle is approaching the stopping location. The water discharge time prediction is calculated based on the blower operating while the fuel cell stack is in at least one of an idle state and a stopped state as the fuel cell vehicle approaches the stopping location.

In some variations, one or more of the features disclosed herein including the following features may optionally be included in any feasible combination. In some variations, the controller is configured to determine an ambient temperature level based on the ambient temperature in response to detecting that the ambient temperature satisfies the threshold temperature. In some variations, calculating the water discharge time prediction is further based on a vehicle speed table that includes a maintained blower speed while the fuel cell stack is in at least one of the idle state and the stopped state, the maintained blower speed corresponding to the ambient temperature level and a vehicle speed, wherein the vehicle speed is indicative of a speed at which the fuel cell vehicle is traveling while the fuel cell stack is in at least one of the idle state and the stopped state. In some variations, calculating the water discharge time prediction is further calculated based on a blower speed factor, the blower speed factor calculated by dividing the maintained blower speed by a maximum blower speed Additionally, calculating the water discharge time prediction is further calculated based on multiplying the blower speed factor by a time for which the fuel cell vehicle is traveling at the vehicle speed while the fuel cell stack is in at least one of the idle state and the stopped state. In some variations, the controller may compare the water discharge time prediction to a required water discharge time, the required water discharge time calculated based on the blower operating at a maximum blower speed for a minimum time duration required for purging the excess water from the fuel cell vehicle; determine that the water discharge time prediction is less than the required water discharge time; and in response to determining that the water discharge time prediction is less than the required water discharge time and that the fuel cell vehicle is stopped, operate the blower to purge the remaining excess water from the fuel cell vehicle.

Further, the controller is configured to operate the blower for a time period based on a difference between the water discharge time prediction and the required water discharge time. In some variations, the minimum time duration required for purging the excess water from the fuel cell vehicle while the blower operates at the maximum blower speed is determined based on a coulomb-to-time table, the coulomb-to-time table including the minimum time duration corresponding to an ambient temperature level and a quantity of coulombs generated by the fuel cell stack. In some variations, the quantity of coulombs generated by the fuel cell vehicle is calculated by integrating the fuel cell current over time.

Additionally, the excess water is purged while the fuel cell vehicle is traveling and the controller is configured to open a drain valve at a fuel cell water trap to discharge excess water from the fuel cell stack. In some variations, determining that the fuel cell vehicle is approaching the stopping location is based on detecting that the fuel cell vehicle is within a predetermined distance of the stopping location. In some variations, determining whether the fuel cell vehicle being is within the predetermined distance of the stopping location is based on a Haversine formula. In some variations, the determination that the fuel cell vehicle is approaching the stopping location is based on a global positioning system (GPS).

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer-implemented methods consistent with one or more implementations of the current subject matter may be implemented by one or more data processors residing in a single computing system or multiple computing systems.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present embodiments may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium may also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure provides a system in which a water discharge time prediction may be calculated to avoid a cold shut down at the stopping location. In particular, the cold shut down may be avoided by discharging the excess water as the fuel cell vehicle is approaching a stopping location. As the fuel cell vehicle approaches the stopping location, the water discharge time prediction may be calculated to determine if the excess water has been discharged from the fuel cell stack. Without the water discharge time prediction, the operator would be required to manually instruct the controller to discharge the excess water.

Further, a water discharge time prediction may be calculated based on an ambient temperature. A controller may be configured to determine an ambient temperature level based on the ambient temperature. The ambient temperature level may be representative of how much colder the ambient temperature is than a threshold ambient temperature. The ambient temperature level may be determined in response to detecting that the ambient temperature is less than the threshold temperature.

The water discharge time prediction may be based on a minimum time duration required for an air blower to remove excess water from the fuel cell stack. The minimum time duration for the air blower to remove excess water may be based on operating the air blower at a maximum air blower speed. In other words, the water discharge time prediction may be calculated based on the air blower operating at a maximum air blower speed for the minimum time duration required to discharge the excess water from the fuel cell stack. The excess water may be purged while the fuel cell vehicle is being driven and the fuel cell stack is in at least one of an idle state and a stopped state. The minimum time duration for the air blower to remove the excess water may correspond to a quantity of coulombs generated by the fuel cell stack.

A coulomb-to-time table may include predetermined time durations needed to discharge the water from the fuel cell stack based on how much power the fuel cell stack has generated over time. The predetermined time durations provided by the coulomb-to-time table may be representative of the minimum time duration required to discharge the excess water from the fuel cell while the air blower operates at the maximum blower speed. The predetermined time durations from the coulomb-to-time table may correspond to the ambient temperature level and a quantity of coulombs generated by the fuel cell stack.

A vehicle speed table may include maintained air blower speeds sustained while the fuel cell stack is idle or stopped and the fuel cell vehicle is traveling. The fuel cell may be idle or stopped as the fuel cell vehicle is traveling. An air blower speed is maintained as the vehicle travels even though the fuel cell may be idle or stopped. The maintained air blower speed may be a minimum air blower speed sustained as the vehicle is driven at a vehicle speed and the fuel cell stack is idle or stopped. The vehicle speed may be indicative of a speed at which the fuel cell vehicle is being driven while the fuel cell stack is in at least one of an idle state and a stopped state. The maintained air blower speeds may correspond to the ambient temperature level and the vehicle speed of the fuel cell vehicle.

Additionally, the water discharge time prediction may be calculated by multiplying a blower speed factor by a time during which the fuel cell vehicle is traveling while the fuel cell stack is in the idle state or the stopped state. The blower speed factor may be calculated by dividing the maintained blower speed by the maximum blower speed. If the water discharge time prediction is greater than the minimum time duration required for purging the excess water from the fuel cell stack based on the quantity of coulombs consumed by the fuel cell vehicle, then a cold shutdown is not necessary. If the water discharge time prediction is less than the minimum time duration required for purging the excess water from the fuel cell stack based on the quantity of coulombs consumed by the fuel cell vehicle, then a cold shutdown is necessary.

The methods, systems, apparatuses, and non-transitory storage mediums described herein calculate a water discharge time prediction in response to determining the fuel cell vehicle is approaching a stopping location. The various embodiments also utilize an ambient temperature level table, a coulomb-to-time table, and a maintained air blower speed during fuel cell idle or stop as the vehicle is traveling.

Figure 1:
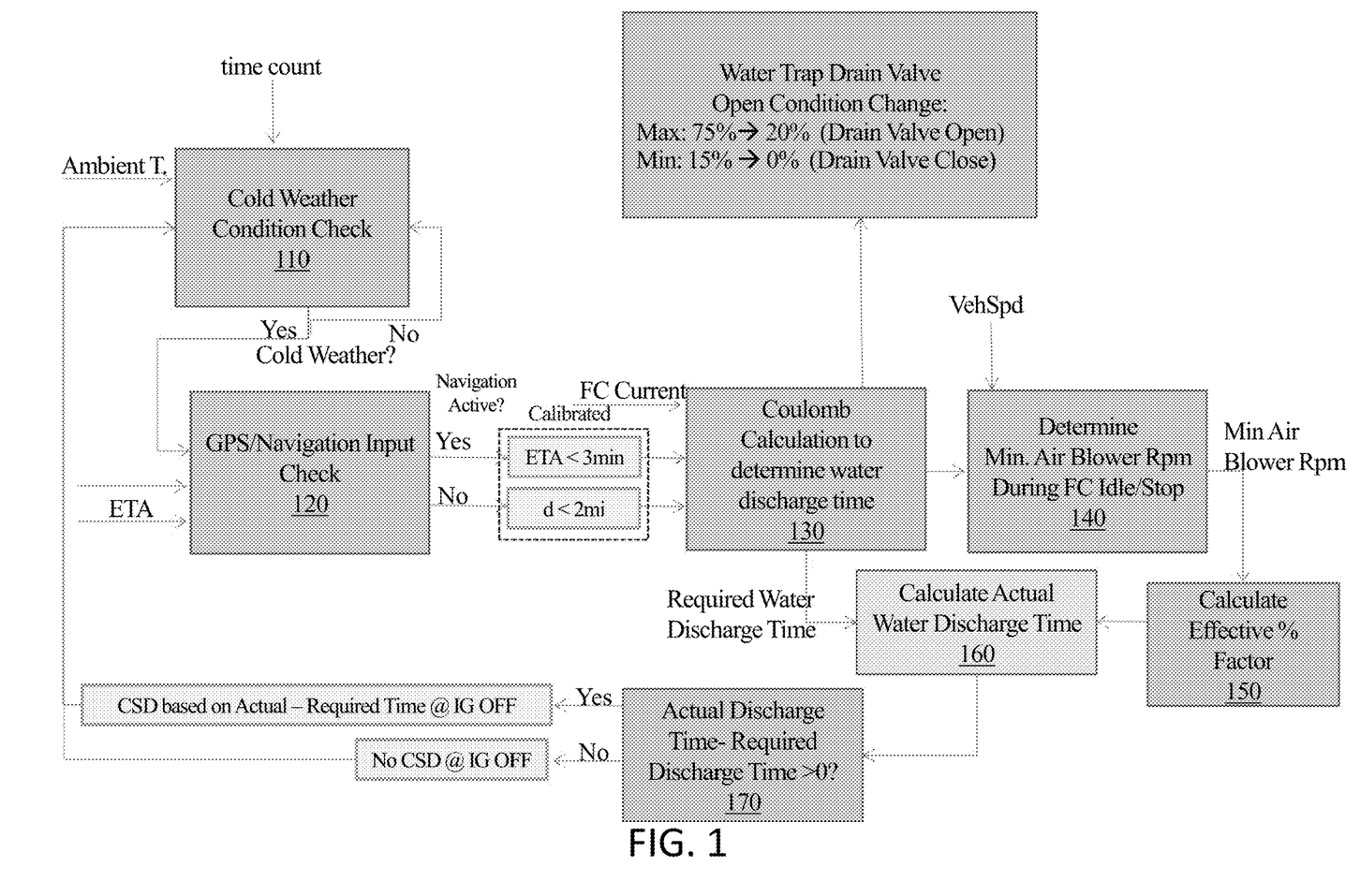
FIG. 1 depicts an example of a flowchart illustrating the calculation of water discharge time prediction as a fuel cell vehicle approaches a stopping point.

FIG. 1 depicts an example of a flowchart illustrating the calculation of water discharge time prediction as a fuel cell vehicle approaches a stopping point. A controller may be communicatively coupled to an ambient temperature sensor, a global positioning system (GPS), a navigation input, a memory configured to store tables, a vehicle speed sensor, an air blower, and a fuel cell status indicator. The controller may be configured to detect data readings from the ambient temperature sensor, the global positioning system, the navigation input, the memory configured to store tables, the vehicle speed sensor, the air blower, and the fuel cell status indicator.

At 110, the controller may be configured to receive a data reading from the ambient temperature. The ambient temperature may be the temperature surrounding the vehicle (e.g., outside temperature). The ambient temperature may be determined by the ambient temperature sensor. The controller may be configured to determine an ambient temperature level based on whether the ambient temperature satisfies a temperature threshold. For example, the controller may be configured to determine that the ambient temperature level is level one based on the temperature being colder than about 10 degrees Celsius and warmer than about −20 degrees Celsius. Additionally, and/or alternatively, the ambient temperature may be determined by a weather forecast. The controller may be configured to determine that the temperature threshold is satisfied based on a forecasted temperature while the vehicle is at the stopping location. For example, the controller may be configured to determine that the ambient temperature level is level two based on the forecasting of the ambient temperature dropping to about −20 degrees Celsius while the vehicle is at the stopping location.

At 120, the controller may be configured to determine whether the vehicle is approaching a stopping location. The controller may be configured to determine that the vehicle is approaching the stopping location by determining the vehicle is within a predetermined distance of the stopping location. In some embodiments, the controller may be configured to determine that the fuel cell vehicle is within the predetermined distance of the stopping location based on a Haversine formula. In some embodiments, the controller may be configured to determine that the vehicle is approaching the stopping location based on a data reading from the global positioning system or the navigation system.

Additionally, the controller may be configured to determine that the vehicle is approaching the stopping location based on the estimated time of arrival satisfying a time threshold. The time threshold may be a time until the vehicle arrives that the stopping location. For example, the controller may be configured to determine that the estimated time of arrival satisfies the time threshold of three minutes by the vehicle being projected to arrive in less than three minutes. The threshold may be a distance between the vehicle and the stopping location. For example, the controller may be configured to determine that the vehicle is less than two miles away from the stopping location, satisfying the threshold of two miles for the vehicle approaching the stopping location.

At 130, the controller may be configured to determine a predetermined time duration to discharge the water from the fuel cell stack based on how much power the fuel cell stack has generated over time. The controller may be configured to access a look-up table (i.e., a coulomb-to-time table) that maps power generated by the fuel cell stack to a predetermined time duration required to discharge the water from the fuel cell stack. For example, the controller may be configured to access a coulomb-to-time table to look up a predetermined time duration required to discharge the water from the fuel cell stack based on a quantity of coulombs generated by the fuel cell stack. The quantity of coulombs may be calculated by integrating the fuel cell current over time.

The predetermined time durations provided by the coulomb-to-time table may be representative of the minimum time duration required for purging the excess water from the fuel cell while the air blower operates at the maximum blower speed. For example, the predetermined time duration of about 15 seconds may be required for purging the excess water from the fuel cell while the air blower operates at maximum blower speed based on the fuel cell generating about 8000 Coulombs and an ambient temperature level of level two. In another example, the predetermined time duration of about 21 seconds may be required for purging the excess water from the fuel cell while the air blower operates at maximum blower speed based on the fuel cell generating about 25,000 Coulombs and an ambient temperature level of level two.

At 140, the controller may be configured to determine a maintained air blower speed to sustain while the fuel cell stack is idle or stopped and the fuel cell vehicle is traveling. The air blower may be configured to remove excess water from the fuel cell stack. The faster the vehicle travels, the higher the speed the air blower needs to operate. As the vehicle is being driven, the fuel cell stack may be idle or stopped, especially as the vehicle coasts or no electric power is generated by the fuel cell stack. To remove the excess water in the fuel cell stack, the air blower may maintain an air blower speed while the fuel cell stack is idle or stopped. In other words, the air blower speed may be maintained as the vehicle travels while the fuel cell stack is idle or stopped.

The maintained air blower speed may be a minimum air blower speed sustained as the vehicle travels at a vehicle speed and the fuel cell stack is idle or stopped. The vehicle speed may be indicative of a speed at which the fuel cell vehicle is being driven while the fuel cell stack is in an idle state or a stopped state. The maintained blower speed may be less than or equal to the maximum blower speed. The maintained air blower speed may be configured to remove excess water at a rate lower than the maximum air blower speed. Additionally, the maintained air blower speeds may correspond to the ambient temperature level and the vehicle speed of the fuel cell vehicle. For example, an air blower speed of about 25,000 RPM may correspond to an ambient temperature level of level two and a vehicle speed of about 20 kilometers per hour. In another example, an air blower speed of about 50,000 RPM may correspond to an ambient temperature level of 3 and a vehicle speed of about 60 kilometers per hour.

At 150, the controller may be configured to determine an air blower speed factor. The maintained air blower speed may be a percentage of the maximum air blower speed. This percentage may be the air blower speed factor. The air blower speed factor may be indicative of the rate at which the maintained air blower speed removes excess water in comparison to the rate at which the maximum air blower speed removes excess water from the fuel cell stack. For example, the air blower speed factor of 0.30 may correspond to a maintained air blower speed of 25,000 RPM when the maximum air blower speed is 75,000 RPM. In another example, the air blower speed factor of 0.70 may correspond to a maintained air blower speed of 25,000 RPM when the maximum air blower speed is 75,000 RPM. The blower speed factor may be calculated by dividing the maintained blower speed by the maximum blower speed.

At 160, the controller may be configured to calculate the water discharge time prediction. The controller may be configured to calculate the water discharge time prediction based on the length of time the fuel cell stack was idle or stopped and the fuel cell vehicle was traveling, a blower speed factor, and the maintained air blower speed. The controller may be configured to determine a length of time that the maintained air blower speed was sustained while the fuel cell stack is idle or stopped and the fuel cell vehicle is traveling. For example, the controller may be configured to determine that the fuel cell vehicle traveled for 20 seconds at 80 kilometers per hour during which the maintained air blower speed was 50,000 RPM while the fuel cell stack was idle or stopped with an ambient temperature level of level two.

The controller may be configured to scale or reduce this length of time (e.g., about 20 seconds) by the air blower speed factor. For example, the 20 seconds during which the maintained air blower speed was sustained while the fuel cell was stopped or idle may be multiplied by an air blower speed factor of 0.70. Accordingly, the water discharge time prediction may be about 14 seconds. The water discharge time may be calculated by multiplying the blower speed factor by a time for which the fuel cell vehicle is being driven at the vehicle speed while the fuel cell stack is in at least one of the idle state and the stopped state. The water discharge time prediction may be representative of the time at which the air blower is operating at the maximum speed.

At 170, the controller may be configured to determine whether a cold shutdown is necessary based on comparing the water discharge time prediction to a required discharge time. The required discharge time may be the minimum time duration required for purging the excess water from the fuel cell stack based on the quantity of coulombs consumed by the fuel cell vehicle. The controller may be configured to determine a cold shutdown is not necessary based on the water discharge time prediction being greater than the required discharge time.

The controller may be configured to determine a cold shutdown is necessary based on the water discharge time prediction being less than the required discharge time. In cases where a cold shutdown is necessary, the controller may be configured to determine how long the fuel cell vehicle needs to run a cold shutdown. To determine how long to run the cold shutdown, the controller may be configured to subtract the water discharge time prediction from the required discharge time. The difference may be the time needed for the fuel cell vehicle to run the cold shutdown. In some embodiments, the required water discharge time may be updated based on the difference between the water discharge time prediction and the required water discharge time.

In some embodiments, the controller may be configured to instruct a drain valve to open at a fuel cell water trap. The controller may be configured to instruct that the drain valve is to be opened when the water in the fuel cell water trap reaches about 75% of the maximum capacity of fuel cell water trap. The controller may be configured to further operate the drain valve to remain open until the water in the fuel cell water trap reaches about 15% of the maximum capacity of fuel cell water trap. When the ambient temperature satisfies a temperature threshold, the controller may be configured to instruct that the drain valve is to be opened when the water in the fuel cell water trap reaches about 20% of the maximum capacity of fuel cell water trap. The controller may be configured to operate the drain valve to remain open until the fuel cell water trap reaches about 0% of the maximum capacity of fuel cell water trap.

Figure 2:
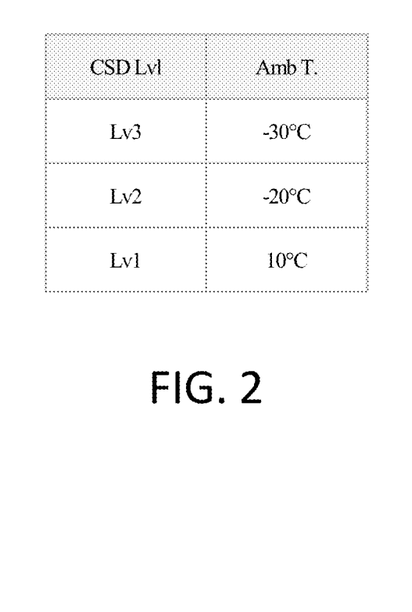
FIG. 2 depicts an example of an ambient temperature level table for determining an ambient temperature level based on the ambient temperature.

FIG. 2 depicts an example of an ambient temperature level table for determining an ambient temperature level based on the ambient temperature. The water discharge time prediction may be calculated based on an ambient temperature. The controller may be configured to determine an ambient temperature level by determining how much colder the ambient temperature is than a threshold ambient temperature. The ambient temperature level may be determined in response to detecting that the ambient temperature is colder than the threshold temperature.

The controller may be configured to determine the ambient temperature from the ambient temperature sensor. In particular, the controller may be configured to determine whether the ambient temperature satisfies a temperature threshold. For example, the controller may be configured to determine the ambient temperature level is level one based on the ambient temperature being colder than about 10 degrees Celsius and warmer than about −20 degrees Celsius. In another example, the controller may be configured to determine the ambient temperature level is three based on the ambient temperature being less than about −30 degrees Celsius.

Figure 3:
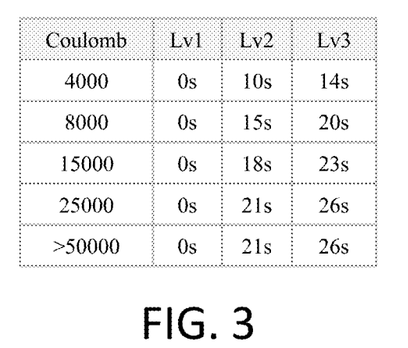
FIG. 3 depicts an example of a coulomb-to-time table for determining a time duration to discharge excess water from the fuel cell based on how many coulombs the fuel cell stack has generated.

FIG. 3 depicts an example of a coulomb-to-time table for determining a time duration to discharge excess water from the fuel cell based on how many coulombs the fuel cell stack has generated. The controller may be configured to access a look-up table (i.e., a coulomb-to-time table) that maps power generated by the fuel cell stack to a predetermined time duration required to discharge the water from the fuel cell stack. For example, the controller may be configured to access a coulomb-to-time table to look up a predetermined time duration required to discharge the water from the fuel cell stack based on a quantity of coulombs generated by the fuel cell stack. The quantity of coulombs may be calculated by integrating the fuel cell current over time.

The coulomb-to-time table may include predetermined time durations needed to discharge the water from the fuel cell stack based on how much power the fuel cell stack has generated over time. The predetermined time durations from the coulomb-to-time table may correspond to the ambient temperature level and a quantity of coulombs generated by the fuel cell stack. The predetermined time durations provided by the coulomb-to-time table may be representative of the minimum time duration required for purging the excess water from the fuel cell while the air blower operates at the maximum blower speed.

The predetermined time durations provided by the coulomb-to-time table may be representative of the minimum time duration required for purging the excess water from the fuel cell while the air blower operates at the maximum blower speed. For example, the predetermined time duration of about 15 seconds may be required for purging the excess water from the fuel cell while the air blower operates at maximum blower speed based on the fuel cell generating about 8000 Coulombs and an ambient temperature level of level 2. In another example, the predetermined time duration of about 21 seconds may be required for purging the excess water from the fuel cell while the air blower operates at maximum blower speed based on the fuel cell generating about 25,000 Coulombs and an ambient temperature level of level 2.

Figure 4:
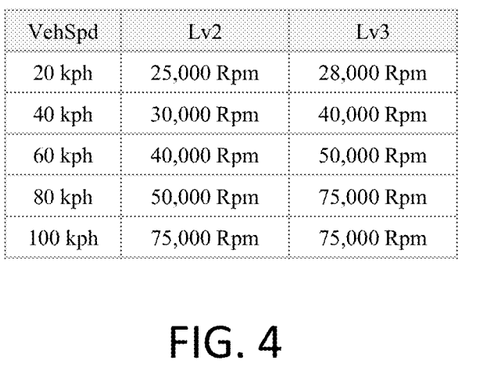
FIG. 4 depicts an example of a vehicle speed table for determining a maintained air blower speed sustained while the fuel cell stack is idle or stopped and the fuel cell vehicle is traveling.

FIG. 4 depicts an example of a vehicle speed table for determining a maintained air blower speed sustained while the fuel cell stack is idle or stopped and the fuel cell vehicle is traveling. A vehicle speed table may include maintained air blower speeds sustained while the fuel cell stack is idle or stopped and the fuel cell vehicle is being driven. The fuel cell may be idle or stopped as the fuel cell vehicle is being driven. An air blower speed may be maintained as the vehicle travels while the fuel cell may be idle or stopped.

The maintained air blower speed may be a minimum air blower speed sustained as the vehicle travels at a vehicle speed and the fuel cell stack is idle or stopped. The vehicle speed may be indicative of a speed at which the fuel cell vehicle is being driven while the fuel cell stack is in at least one of an idle state and a stopped state. The maintained air blower speeds may correspond to the ambient temperature level and the vehicle speed of the fuel cell vehicle. The maintained blower speed may be less than or equal to the maximum blower speed.

Further, the air blower removes excess water from the fuel cell stack. In particular, the faster the vehicle travels, the higher the speed the air blower needs to operate. As the vehicle is being driven, the fuel cell stack may be idle or stopped, especially as the vehicle coasts or no electric power is generated by the fuel cell stack. Accordingly, to remove the excess water in the fuel cell stack, the air blower may be configured to maintain an air blower speed while the fuel cell stack is idle or stopped. In other words, the air blower speed may be maintained as the vehicle is being driven even though the fuel cell may be idle or stopped.

The maintained air blower speed may be configured to remove excess water at a rate lower than the maximum air blower speed. The maintained air blower speeds may correspond to the ambient temperature level and the vehicle speed of the fuel cell vehicle. For example, an air blower speed of about 25,000 RPM corresponds to an ambient temperature level of level two and a vehicle speed of about 20 kilometers per hour. In another example, an air blower speed of about 50,000 RPM corresponds to an ambient temperature level of level three and a vehicle speed of about 60 kilometers per hour.

Figure 5:
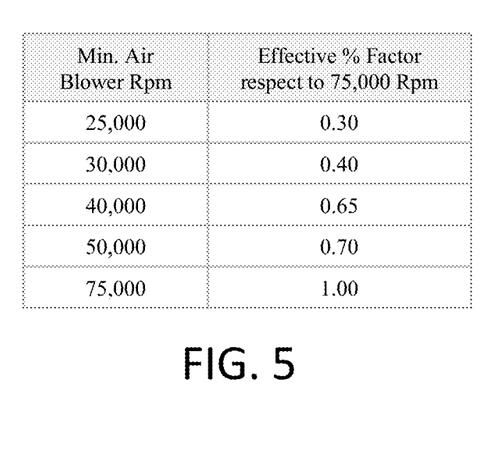
FIG. 5 depicts an example of a blower speed factor table for determining the maintained air blower speed as a percentage of the maximum air blower speed.

FIG. 5 depicts an example of a blower speed factor table for determining the maintained air blower speed as a percentage of the maximum air blower speed. The maintained air blower speed may be a percentage of the maximum air blower speed. This percentage may be the air blower speed factor. The air blower speed factor may be indicative of the rate at which the maintained air blower speed removes excess water in comparison to the rate at which the maximum air blower speed removes excess water from the fuel cell stack. For example, the air blower speed factor of 0.30 may correspond to a maintained air blower speed of 25,000 RPM when the maximum air blower speed is 75,000 RPM. In another example, the air blower speed factor of 0.70 may correspond to a maintained air blower speed of 25,000 RPM when the maximum air blower speed is 75,000 RPM. The blower speed factor may be calculated by dividing the maintained blower speed by the maximum blower speed.

Figure 6A:
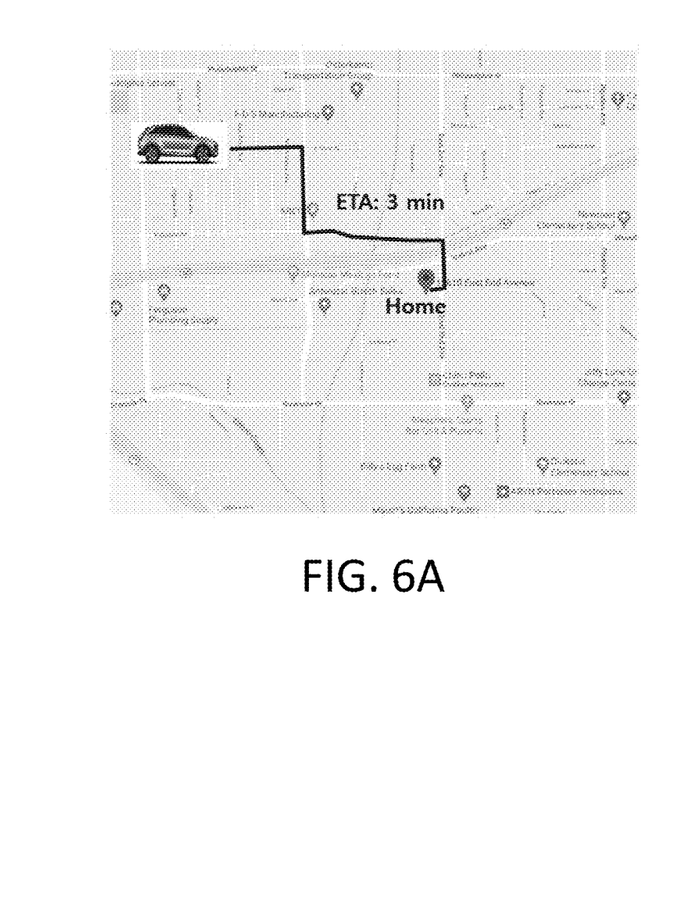
FIG. 6A depicts an example of a diagram illustrating how a controller determines the vehicle is approaching a stopping location.

FIG. 6A depicts an example of a diagram illustrating how a controller determines the vehicle is approaching a stopping location. The controller may be configured to determine whether the vehicle is approaching a stopping location. In some embodiments, the controller may be configured to determine that the vehicle is approaching the stopping location based on a data reading from the global positioning system or the navigation system. The controller may be configured to determine that the vehicle is approaching the stopping location based on an estimated time of arrival satisfying a time threshold. The time threshold may be the time until the vehicle arrives at the stopping location. For example, the controller may be configured to determine that the estimated time of arrival satisfies the time threshold of three minutes by the vehicle projected to arrive in less than three minutes.

Figure 6B:
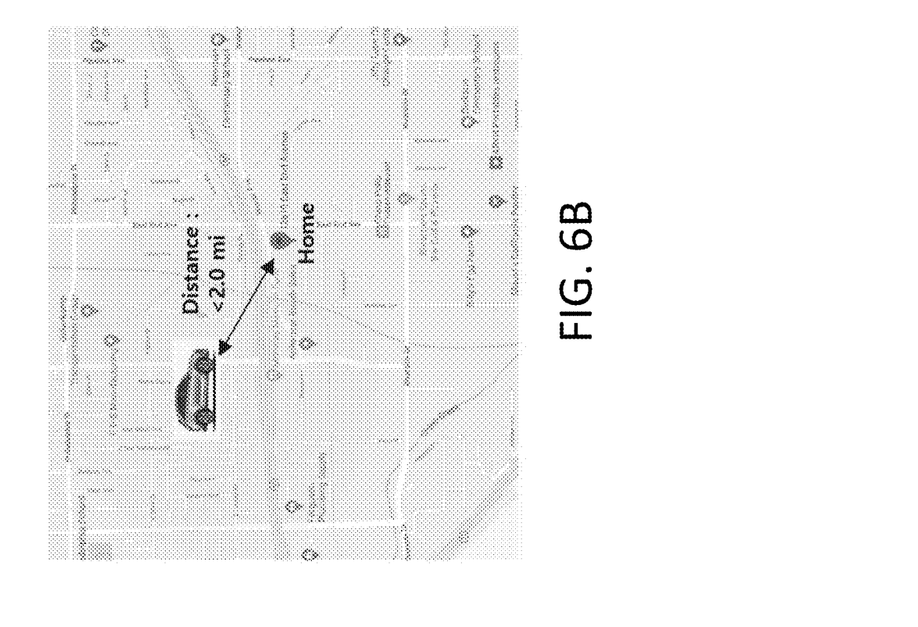
FIG. 6B depicts another example of a diagram illustrating how a controller determines the vehicle is approaching a stopping location.

FIG. 6B depicts another example of a diagram illustrating how a controller determines the vehicle is approaching a stopping location. The controller may be configured to determine whether the vehicle is approaching a stopping location. The controller may be configured to determine that the vehicle is approaching the stopping location by determining the vehicle is within a predetermined distance from the stopping location. For example, the controller may be configured to determine that the vehicle is less than two miles away from the stopping location, which is less than the predetermined distance from the stopping location. In some embodiments, the controller be configured to determine that the fuel cell vehicle is within the predetermined distance of the stopping location based on a Haversine formula, which may be shown by the following equation:

$$d = 2r\arcsin\left(\sqrt{hav(\varphi_1 - \varphi_2) + \cos(\varphi_1)\cos(\varphi_2)hav(\lambda_2 - \lambda_1)}\right) =$$

-continued $$2r\arcsin\left(\sqrt{\sin^2\left(\frac{\varphi_1-\varphi_2}{2}\right)+\cos(\varphi_1)\cos(\varphi_2)\sin^2\left(\frac{\lambda_2-\lambda_1}{2}\right)}\right)$$

wherein d is the distance between the two points along a great circle of the sphere, r is the radius of the sphere, $\varphi_1$, $\varphi_2$ are the latitude of point 1 and latitude of point 2 (in radians), $\lambda_1$, $\lambda$ are the longitude of point 1 and longitude of point 2 (in radians).

Figure 7:
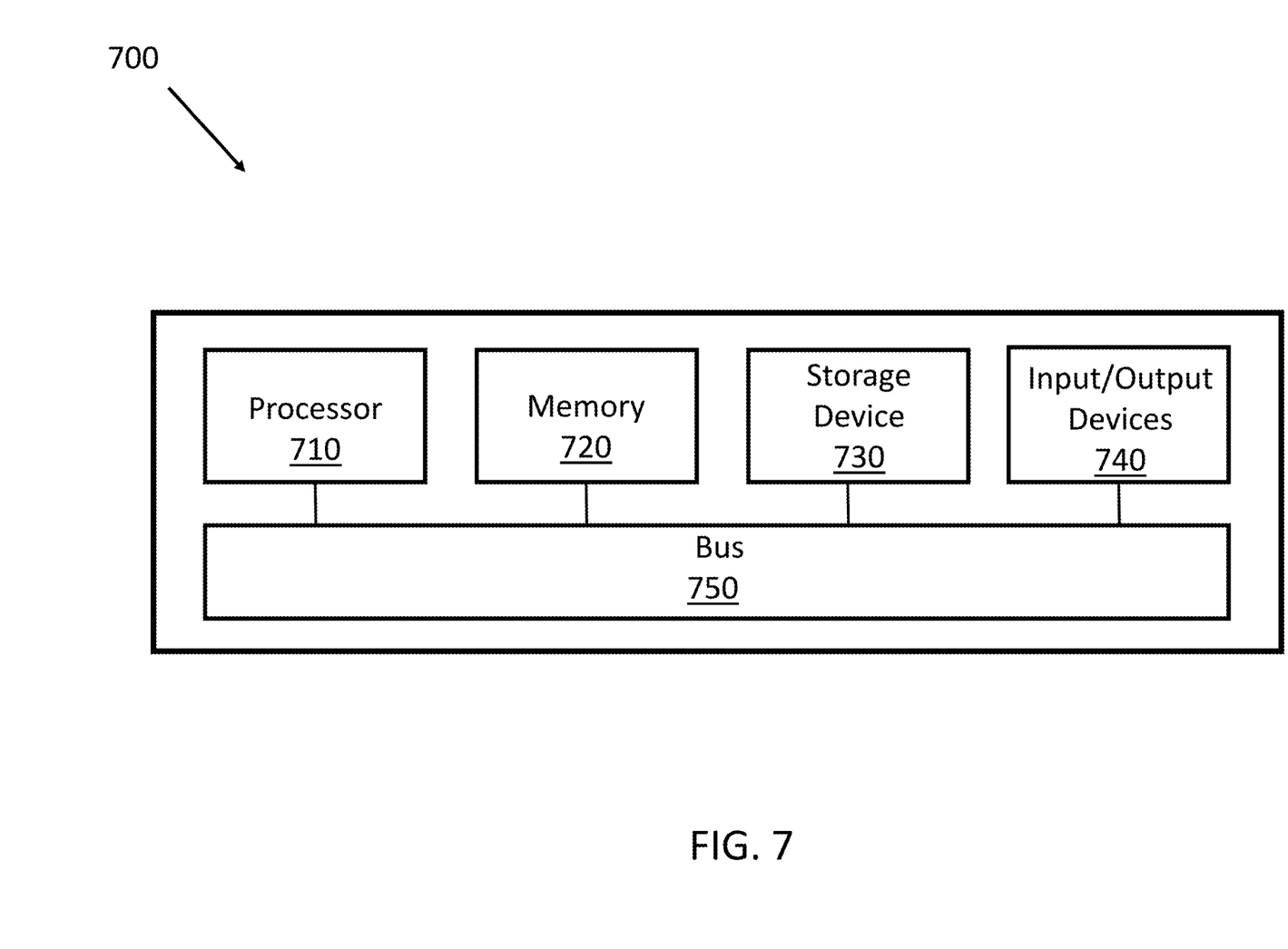
FIG. 7 depicts a block diagram illustrating a computing system consistent with implementations of the current subject matter.

FIG. 7 depicts a block diagram illustrating a computing system 700 consistent with implementations of the current subject matter. Referring to FIGS. 1-7, the computing system 1000 may be used to calculate a water discharge time prediction. For example, the computing system 1000 may implement a user equipment, a personal computer, or a mobile device.

As shown in FIG. 7, the computing system 700 may include a processor 710, a memory 720, a storage device 730, and an input/output device 740. The processor 710, the memory 720, the storage device 730, and the input/output device 740 may be interconnected via a system bus 750. The processor 710 is capable of processing instructions for execution within the computing system 700. Such executed instructions may implement one or more components of, for example, cross-cloud code detection. In some example embodiments, the processor 710 may be a single-threaded processor. Alternately, the processor 710 may be a multi-threaded processor. The processor 710 is capable of processing instructions stored in the memory 720 and/or on the storage device 730 to display graphical information for a user interface provided via the input/output device 740.

The memory 720 is a non-transitory computer-readable medium that stores information within the computing system 700. The memory 720 may be configured to store data structures representing configuration object databases, for example. The storage device 730 is capable of providing persistent storage for the computing system 700. The storage device 730 may be a floppy disk device, a hard disk device, an optical disk device, or a tape device, or other suitable persistent storage means. The input/output device 740 provides input/output operations for the computing system 700. In some example embodiments, the input/output device 740 includes a keyboard and/or a pointing device. In various implementations, the input/output device 740 includes a display unit for displaying graphical user interfaces.

According to some example embodiments, the input/output device 740 may provide input/output operations for a network device. For example, the input/output device 740 may include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 700 may be used to execute various interactive computer software applications that may be used for organization, analysis and/or storage of data in various formats. Alternatively, the computing system 700 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing items and/or functionalities. Upon activation within the applications, the functionalities may be used to generate the user interface provided via the input/output device 740. The user interface may be generated and presented to a user by the computing system 700 (e.g., on a computer screen monitor, etc.).

The technical advantages presented herein may result in an efficient way to discharge water in the fuel cell stack prior to the vehicle arriving at the stopping location. Calculating the water discharge time prediction as the vehicle approaches the stopping point reduces or eliminates the need for a cold shut down. During a cold shut down, an air blower may operate at maximum speed to discharge the water from the fuel cell stack. The air blower may be loud and generate noise, potentially alarming operators and bystanders. More worrisome, ice created by the discharged water may create safety concerns for operators and bystanders. Currently, the operator would be required to manually instruct the controller to discharge the excess water to avoid the risks of creating ice and loud noise.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A water discharge system for a fuel cell vehicle comprising:
 a fuel cell stack;
 a blower for purging water from the fuel cell stack; and
 a controller configured to:
  detect that an ambient temperature satisfies a threshold temperature;
  determine the fuel cell vehicle is approaching a stopping location; and
  in response to detecting that the ambient temperature satisfies the threshold temperature and the fuel cell vehicle is approaching the stopping location, calculate a water discharge time prediction necessary to purge excess water intended to be purged from the fuel cell stack while the fuel cell vehicle is operating, wherein the water discharge time prediction is calculated based on the blower operating while the fuel cell stack is in at least one of an idle state and a stopped state as the fuel cell vehicle approaches the stopping location.

2. The water discharge system of claim 1, wherein the controller is configured to:
 in response to detecting that the ambient temperature satisfies the threshold temperature, determine an ambient temperature level based on the ambient temperature.

3. The water discharge system of claim 2, wherein calculating the water discharge time prediction is further based on a vehicle speed table that includes a maintained blower speed while the fuel cell stack is in at least one of the idle state and the stopped state, the maintained blower speed corresponding to the ambient temperature level and a vehicle speed, wherein the vehicle speed is indicative of a speed at which the fuel cell vehicle is traveling while the fuel cell stack is in at least one of the idle state and the stopped state.

4. The water discharge system of claim 3, wherein calculating the water discharge time prediction is further based on a blower speed factor, the blower speed factor calculated by dividing the maintained blower speed by a maximum blower speed.

5. The water discharge system of claim 4, wherein calculating the water discharge time prediction is further based on multiplying the blower speed factor by a time for which the fuel cell vehicle is traveling at the vehicle speed while the fuel cell stack is in at least one of the idle state and the stopped state.

6. The water discharge system of claim 1, wherein the controller is configured to:
compare the water discharge time prediction to a required water discharge time, the required water discharge time calculated based on the blower operating at a maximum blower speed for a minimum time duration required for purging the excess water from the fuel cell vehicle;
determine that the water discharge time prediction is less than the required water discharge time; and
in response to determining that the water discharge time prediction is less than the required water discharge time and that the fuel cell vehicle is stopped, operate the blower to purge the excess water that remains from the fuel cell vehicle.

7. The water discharge system of claim 6, wherein the controller is configured to:
operate the blower for a time period based on a difference between the water discharge time prediction and the required water discharge time.

8. The water discharge system of claim 6, wherein the minimum time duration required for purging the excess water from the fuel cell vehicle while the blower operates at the maximum blower speed is determined based on a coulomb-to-time table, the coulomb-to-time table including the minimum time duration corresponding to an ambient temperature level and a quantity of coulombs generated by the fuel cell stack.

9. The water discharge system of claim 8, wherein the quantity of coulombs generated by the fuel cell stack is calculated by integrating a fuel cell stack current over time.

10. The water discharge system of claim 1, wherein the excess water is purged while the fuel cell vehicle is traveling and the controller is configured to open a drain valve at a fuel cell water trap to discharge excess water from the fuel cell stack.

11. The water discharge system of claim 1, wherein determining that the fuel cell vehicle is approaching the stopping location is based on detecting that the fuel cell vehicle is within a predetermined distance of the stopping location.

12. The water discharge system of claim 11, wherein the detecting that the fuel cell vehicle is within the predetermined distance of the stopping location is based on a Haversine formula.

13. The water discharge system of claim 11, wherein the determining that the fuel cell vehicle is approaching the stopping location is based on a global positioning system (GPS).

14. A non-transitory computer-readable storage medium storing instructions that, when executed by a processor, cause the processor to perform operations comprising:
detecting that an ambient temperature satisfies a threshold temperature;
determining a fuel cell vehicle is approaching a stopping location; and
in response to detecting that the ambient temperature satisfies the threshold temperature and the fuel cell vehicle is approaching the stopping location, calculating a water discharge time prediction necessary to purge excess water intended to be purged from a fuel cell stack while the fuel cell vehicle is operating,
wherein the water discharge time prediction is calculated based on a blower operating while the fuel cell stack is in at least one of an idle state and a stopped state as the fuel cell vehicle approaches the stopping location.

15. The non-transitory computer-readable storage medium of claim 14, wherein the operations further comprise:
in response to detecting that the ambient temperature satisfies the threshold temperature, determining an ambient temperature level based on the ambient temperature.

16. The non-transitory computer-readable storage medium of claim 15, wherein calculating the water discharge time prediction is further based on a vehicle speed table that includes a maintained blower speed while the fuel cell stack is in at least one of the idle state and the stopped state, the maintained blower speed corresponding to the ambient temperature level and a vehicle speed, wherein the vehicle speed is indicative of a speed at which the fuel cell vehicle is traveling while the fuel cell stack is in at least one of the idle state and the stopped state.

17. The non-transitory computer-readable storage medium of claim 16, wherein calculating the water discharge time prediction is further based on a blower speed factor, the blower speed factor calculated by dividing the maintained blower speed by a maximum blower speed.

18. The non-transitory computer-readable storage medium of claim 17, wherein calculating the water discharge time prediction is further based on multiplying the blower speed factor by a time for which the fuel cell vehicle is traveling at the vehicle speed while the fuel cell stack is in at least one of the idle state and the stopped state.

19. The non-transitory computer-readable storage medium of claim 14, wherein the operations further comprise:
comparing the water discharge time prediction to a required water discharge time, the required water discharge time calculated based on the blower operating at a maximum blower speed for a minimum time duration required for purging the excess water from the fuel cell vehicle;
determining that the water discharge time prediction is less than the required water discharge time; and
in response to determining that the water discharge time prediction is less than the required water discharge time and that the fuel cell vehicle is stopped, operating the blower to purge the excess water remaining from the fuel cell vehicle.

20. A method comprising:
detecting that an ambient temperature satisfies a threshold temperature;
determining a fuel cell vehicle is approaching a stopping location; and
in response to detecting that the ambient temperature satisfies the threshold temperature and the fuel cell vehicle is approaching the stopping location, calculating a water discharge time prediction necessary to purge excess water intended to be purged from a fuel cell stack while the fuel cell vehicle is operating,
wherein the water discharge time prediction is calculated based on a blower operating while the fuel cell stack is in at least one of an idle state and a stopped state as the fuel cell vehicle approaches the stopping location.

* * * * *